United States Patent
Kessler (10) Patent No.: US 11,225,171 B2
(45) Date of Patent: Jan. 18, 2022

(54) METHOD FOR CHARGING A STARTER BATTERY AND CHARGING DEVICE FOR CHARGING A STARTER BATTERY

(71) Applicant: Conti Temic microelectronic GmbH, Nuremberg (DE)

(72) Inventor: Erwin Kessler, Bad Salgau (DE)

(73) Assignee: Conti Temic microelectronic GmbH

( * ) Notice: Subject to any disclaimer, the term of this patent is extended or adjusted under 35 U.S.C. 154(b) by 226 days.

(21) Appl. No.: 16/668,926

(22) Filed: Oct. 30, 2019

(65) Prior Publication Data
US 2020/0130533 A1    Apr. 30, 2020

(30) Foreign Application Priority Data
Oct. 30, 2018   (DE) .................. 10 2018 218 596.4

(51) Int. Cl.
| | |
|---|---|
| H02J 7/00 | (2006.01) |
| H02J 7/14 | (2006.01) |
| B60L 58/25 | (2019.01) |
| B60L 50/61 | (2019.01) |
| B60L 53/62 | (2019.01) |
| F02N 11/08 | (2006.01) |
| B60L 53/20 | (2019.01) |

(52) U.S. Cl.
CPC .............. *B60L 58/25* (2019.02); *B60L 50/61* (2019.02); *B60L 53/20* (2019.02); *B60L 53/62* (2019.02); *F02N 11/0862* (2013.01); *H02J 7/007192* (2020.01)

(58) Field of Classification Search
None
See application file for complete search history.

(56) References Cited

U.S. PATENT DOCUMENTS

| | | | | |
|---|---|---|---|---|
| RE36,428 E | * | 12/1999 | Moore | ..................... B60J 5/06 296/155 |
| 6,108,976 A | * | 8/2000 | Kato | .................... B60R 16/027 49/352 |
| 6,236,118 B1 | * | 5/2001 | Vasija | ....................... F03G 1/02 290/1 E |
| 7,049,708 B2 | * | 5/2006 | Hartman | .................. G05G 1/30 290/1 A |
| 8,598,721 B2 | | 12/2013 | Baarman et al. | |
| 9,151,079 B2 | | 10/2015 | Webb et al. | |

(Continued)

FOREIGN PATENT DOCUMENTS

| | | |
|---|---|---|
| CN | 103696669 A | 4/2014 |
| DE | 19814670 A1 | 10/1998 |
| JP | 2019002179 A | 1/2019 |

*Primary Examiner* — Alexis B Pacheco (57) ABSTRACT

A method for charging a starter battery of a vehicle is disclosed, wherein the vehicle has at least one movable opening element and a motor unit, which is coupled to the opening element and is operable in a motor-powered drive mode to drive the opening element and in a generator mode to generate an electrical voltage, said method comprising: detecting the generator mode of the motor unit using the electrical voltage generated by the motor unit, comparing the generated electrical voltage with a specified voltage value, and establishing an electrical connection from the motor unit to the starter battery to charge the starter battery, if the generated electrical voltage is greater than the voltage value.

14 Claims, 8 Drawing Sheets

(56) References Cited

U.S. PATENT DOCUMENTS

| | | | |
|---|---|---|---|
| 2009/0265992 A1* | 10/2009 | Hass | E05F 15/63 49/340 |
| 2009/0302637 A1* | 12/2009 | Iijima | E05F 15/643 296/155 |
| 2010/0026142 A1 | 2/2010 | Jones et al. | |
| 2010/0320959 A1* | 12/2010 | Tomberlin | B62D 31/003 320/101 |
| 2012/0153635 A1* | 6/2012 | Tsivicos | H02K 7/1853 290/1 R |
| 2012/0259495 A1* | 10/2012 | Sakai | B60L 3/04 701/22 |
| 2013/0127180 A1* | 5/2013 | Heberer | E05B 81/80 292/2 |
| 2016/0068122 A1 | 3/2016 | Johnson et al. | |
| 2016/0153216 A1* | 6/2016 | Funahashi | E05B 81/56 292/2 |
| 2021/0123279 A1* | 4/2021 | Balder | E05D 15/24 |

* cited by examiner

METHOD FOR CHARGING A STARTER BATTERY AND CHARGING DEVICE FOR CHARGING A STARTER BATTERY

BRIEF DESCRIPTION OF THE DRAWINGS

Shown are.

Elements of the same design or function are labelled with the same reference numerals across all figures.

DETAILED DESCRIPTION

The present disclosure relates to a method for charging a starter battery of a vehicle and to a charging device for charging a starter battery of a vehicle.

Vehicles typically have a starter battery which, among other things, delivers electrical energy for a starter of an engine of the vehicle. The annual breakdown statistics show, however, that over the cold season, in particular, many vehicles can no longer be started due to too low a starter battery.

The possibility exists, of course, to recharge the starter battery of the vehicle using the starter battery of another vehicle or to notify the towing service, who will be able to charge the starter battery. However, such measures take time, which the driver of the vehicle may not be willing to spend waiting, especially during the cold season.

The object of the present disclosure, therefore, is to provide a method for charging a starter battery of a vehicle with which a starter battery can be recharged quickly and without unnecessary waiting time. A further object of the present disclosure is to provide a charging device for charging a starter battery, with which the starter battery can be recharged quickly and without unnecessary waiting time.

According to a first aspect, a method for charging a starter battery of a vehicle is provided, wherein the vehicle has at least one movable opening element, such as for example a door or a tailgate, and a motor unit which is coupled to the opening element. The motor unit can be operated herein in a motor-powered drive mode for driving the opening element and in a generator mode for generating an electrical voltage. The method comprises the following steps: detecting the generator mode of the motor unit on the basis of the electrical voltage generated by the motor unit, comparing the generated electrical voltage with a specified voltage value, and establishing an electrical connection from the motor unit to the starter battery to charge the starter battery if the generated electrical voltage is greater than the voltage value.

The idea is that the motor unit for operating the opening element is always also operable in the generator mode. If the electrical voltage generated in the generator mode of the motor unit is greater than a specified voltage value, by simply making an electrical connection from the motor unit to the starter battery the generated electrical voltage can be used to charge the starter battery. Since in modern vehicles the doors and, in particular, the tailgate of the vehicle are usually motor operated, by a simple back and forth movement of the door or tailgate, for example, enough electrical voltage can therefore be generated in the already existing motor unit, which is then used to charge the starter battery. Assuming, for example, a power of 240 W input by manual force via the opening element, such as for example the tailgate, and an efficiency of 50%, then an input power of 120 W is obtained. In the case of an on-board power supply voltage of 12 V, this results in a charging current of 10 A. If it is also assumed that, for example, for an engine start of a conventional starter battery approximately 200 A are required for approximately 5 seconds, this corresponds to a charge of 0.27 Ah. To charge an empty starter battery by 1 Ah, with an average power input of 10 A it would therefore only be necessary to move the opening element or the tailgate for about 6 minutes to generate a sufficiently high electrical voltage with which it is possible to charge the starter battery. The method therefore provides a means with which a starter battery of a vehicle can be charged, without needing to rely on the starter battery of another vehicle or a towing service. If the opening element is a tailgate which is motor-powered via a motor unit, the method also does not require any additional components or other so-called "energy harvesters" proposed in the prior art, to charge the starter battery. Instead, by moving the opening element it is sufficient to generate an electrical voltage in the already existing motor unit, which can then—provided it is larger than the specified voltage value—be used for charging the starter battery by establishing an electrical connection from the motor unit to the starter battery.

In the motor units and motor-powered opening elements known in the prior art, however, in particular motor-powered tailgates, the feedback of the electric voltage generated during the manual operation of the opening element into the starter battery is currently disallowed by the control electronics of the motor unit. If, however, using the method an electrical connection is made from the motor unit to the starter battery only when the generated electrical voltage is greater than the specified voltage value, then the electrical blocking known in the prior art between the motor unit and the starter battery is overcome, so that the electrical voltage, which is produced anyway, can be used for charging the starter battery.

The specified voltage value can be herein either a fixed threshold value, which has been determined using models or series of measurements, for example, and is dimensioned such that when the threshold value is exceeded the electrical connection is established from the motor unit to the starter battery and the starter battery can be charged. The voltage value is preferably, however, a voltage that can be supplied by the starter battery, in particular an actual voltage or a terminal voltage of the starter battery. This can easily be determined and generally represents the voltage that can currently be supplied by or is available from the starter battery. If the electrical voltage generated in the generator mode of the motor unit exceeds the actual voltage or the terminal voltage of the starter battery, it can be assumed that the starter battery can be charged. This ensures that the electrical connection from the motor unit to the starter battery is in fact only established if the starter battery can actually be charged.

According to a particularly preferred exemplary embodiment the electrical connection between the motor unit and the starter battery is only established if the electrical voltage generated in the generator mode is greater by a threshold value than the voltage value, or the voltage that can be supplied by the starter battery. This ensures that the charging current for charging the starter battery is at least equal to a minimum charging current.

According to a further exemplary embodiment of the method a temperature of the motor unit is additionally determined and the electrical connection from the motor unit to the starter battery is only established if the determined temperature is below a threshold temperature. The threshold temperature can be, for example, a critical temperature of the motor unit, which must not be exceeded during proper operation of the motor unit. For example, the temperature can be calculated using a temperature model or determined by series of measurements. This design ensures that the charging of the starter battery and/or the feedback of the electrical voltage generated in the generator mode of the motor unit into the starter battery only takes place if the temperature of the motor unit is below the threshold temperature or the critical temperature of the motor unit. In other words, by using this design the feedback of the voltage produced by the generator into the starter battery can be interrupted until such time as the temperature of the motor unit falls below the permissible critical temperature or below the threshold temperature. This enables, for example, an overheating of the motor unit to be avoided.

According to a further exemplary embodiment of the method, the electrical connection is also briefly interrupted after the electrical connection has been established. Due to the brief interruption of the electrical connection, no current flows from the motor unit to the starter battery. The consequence of this is that the opening element moves more easily than when an established electrical connection exists from the motor unit to the starter battery, because during the brief interruption of the electrical connection no current is drawn, but only the electrically generated voltage is applied across the motor unit.

It is also conceivable that once the electrical connection is established, the motor unit is briefly short-circuited. The consequence of this is that the movement of the opening element is more difficult than when an established electrical connection exists from the motor unit to the starter battery. Also, it is conceivable that the brief interruption of the electrical connection (and thus the smooth movement of the opening element) and/or the brief short-circuiting of the motor unit (and thus the less smooth movement of the opening element) takes place alternately with the establishment of the electrical connection. In this case, during the movement the opening element would be moved alternately stiffly and smoothly, which is perceived by the operator of the opening element as a jerky movement.

Particularly preferably, the brief interruption of the electrical connection and/or the brief short-circuiting of the motor unit and/or the alternating creation of the electrical connection takes place when an electrical power generated by the motor unit in the generator mode exceeds a power threshold. In this way, the stiff movement of the opening element, the smooth movement of the opening element and/or the jerky movement of the opening element can be used as feedback to the operator of the opening element to warn the operator that, for example, the electrical power generated by him/her is above a power threshold. This in particular creates an overload protection for the motor unit, which prevents the motor unit being overheated in the generator mode due to too rapid up and down movement of the opening element and thereby possibly suffering damage. Of course, a different means of inducing variation in the current drawn in the generator mode of the motor unit can also be used as feedback to the operator, in the interests of providing overload protection.

According to a further exemplary embodiment of the method, the method also has the step of: determining a state of charge of the starter battery, wherein the step of detecting the generator mode and the step of comparing the generated electrical voltage with the specified voltage value are only carried out if the determined state of charge is below a predetermined state of charge threshold. In other words, in this embodiment the method steps described so far are only carried out if the determined state of charge is below the predetermined state of charge threshold. The state of charge of the starter battery can therefore be used as a trigger criterion for the execution of the respective method steps.

According to a further exemplary embodiment of the method, the method also has the step of: determining an operator input, for example, by an operator of the opening element and/or of the vehicle, wherein the step of detecting the generator mode and the step of comparing the generated electrical voltage with the specified voltage value are only performed if the operator input matches a predetermined reference input. In this embodiment, as an alternative or in addition to the trigger criterion of the "charge status check" of the starter battery, the trigger criterion of an operator input can be used for the execution of the other method steps described so far.

For example, it is conceivable for an operator input to be used as a trigger criterion to distinguish between a normal manual operation of the opening element and the generator-powered charging operation of the opening element. For example, an operator input could involve the opening element being moved back and forth several times, without going into a locked state. Also, it is conceivable for an operator input to take the form of a key combination (for example, pressing the tailgate button three times), the form of a voice command ("charge the starter battery") or a different HMI input, to indicate that the charging of the starter battery should now be carried out. Of course, it is also conceivable that in a further exemplary embodiment a corresponding operator input can be determined, which is then used as a trigger criterion to terminate the generator-powered charging mode.

Of course, the respective exemplary embodiments of the method can be combined with each other in any meaningful and technically feasible way.

According to a second aspect a charging device for charging a starter battery of a vehicle is provided, wherein the vehicle has at least one movable opening element and a motor unit which is coupled to the opening element and which can be operated in a motor-powered drive mode to drive the opening element and in a generator mode to generate an electrical voltage, wherein said motor unit is electrically connected to the starter battery via an electrical connection. The charging device also comprises the following components: an electrical switch element, which is arranged in the electrical connection and has a first switching state for establishing the electrical connection and a second switching state for interrupting the electrical connection, and a control unit for controlling the switching states of the switch element, wherein the control unit is designed to carry out a method in accordance with the first aspect or exemplary embodiments thereof. Using the charging device, it is possible to charge the starter battery of the vehicle by generating a sufficiently large electrical voltage in the motor unit of the opening element, without the need to call a towing service or to wait for another vehicle to charge the starter battery. In addition, no additional components need to be installed in the vehicle, to implement the charging device.

Advantageous exemplary embodiments of the method, where applicable to the charging device, should also be regarded as advantageous exemplary embodiments of the charging device, and vice versa.

Further features and objects will become apparent to a person skilled in the art by practising the present teaching and taking into consideration the accompanying drawings.

Figure 1:
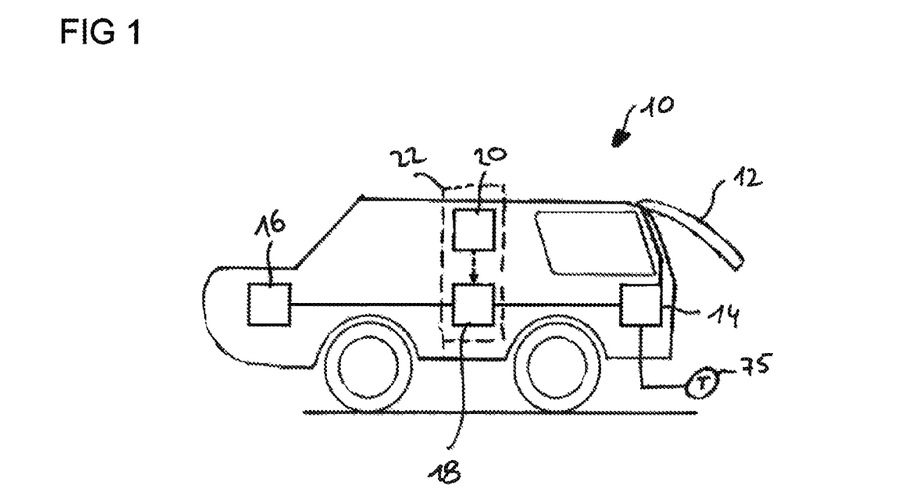
FIG. 1 a schematic view of a vehicle with an exemplary embodiment of a charging device for charging a starter battery of a vehicle, FIG. 2 a schematic view of a circuit diagram, in which a motor unit of the vehicle is operated in an exemplary motor-powered drive mode, FIG. 3 a schematic view of an exemplary circuit diagram, in which a motor unit of the vehicle is operated in an exemplary generator mode, FIG. 4 a schematic view of a circuit diagram according to one exemplary embodiment of a method for charging a starter battery of a vehicle, in which an electrical connection is established from the motor unit to the starter battery, FIG. 5 a schematic view of a circuit diagram according to a further exemplary embodiment of the method, in which after the establishment of the electrical connection, the electrical connection is briefly interrupted and/or the motor unit is briefly short-circuited, FIG. 6 a schematic view of a flow chart according to one exemplary embodiment of the method, FIG. 7 a schematic view of a flow chart according to a further exemplary embodiment of the method, FIG. 8 a schematic view of a flow chart according to a further exemplary embodiment of the method, FIG. 9 a schematic view of a flow chart according to a further exemplary embodiment of the method, and FIG. 10 a schematic view of a flow chart according to a further exemplary embodiment of the method.

Referring initially to FIG. 1, this shows a schematic view of a vehicle 10, which has a movable opening element 12. The movable opening element 12 is an externally operated or motor-driven opening element that is coupled to a motor unit 14. The motor unit 14 can be operated herein in a motor-powered drive mode for driving the opening element 12 and in a generator mode for generating an electrical voltage. The motor unit 14 is therefore an electrical machine that can be operated both as a motor and as a generator. In the specific example of FIG. 1 the opening element is a tailgate of the vehicle 10 and the motor unit 14 is the motor unit of the tailgate. Of course, in other exemplary embodiments the opening element 12 can be a different opening element than the tailgate of the vehicle 10. For example, it is conceivable that the opening element is a side door of the vehicle 10.

As also shown in FIG. 1, the motor unit 14 is electrically connected to a starter battery 16 of the vehicle 10. In this electrical connection an electrical switch element 18 is located, that in a first switching state establishes the electrical connection between the motor unit 14 and the starter battery 16 and in a second switching state, interrupts the electrical connection between the motor unit 14 and the starter battery 16. As is also shown in FIG. 1, the electrical switch element 18 is controlled by a control unit 20, wherein the control unit 20 controls, in particular, the switching states of the switch element 18, as will be shown later. The electrical switch element 18 and the control unit 20 form herein a charging device 22 which is configured for charging the starter battery 16 of the vehicle 10.

Figure 2:
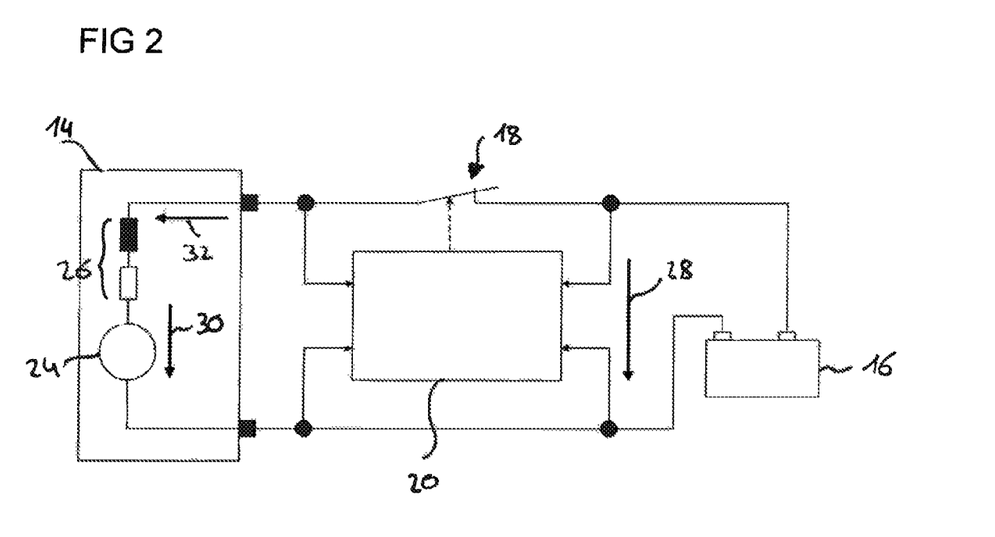

Referring now to FIG. 2, this shows a schematic view of a circuit diagram in which the motor unit 14 is operated in a motor-powered drive mode.

In FIG. 2 the motor unit 14 is represented as an electrical equivalent circuit diagram with the winding of the motor (represented by components 26) and a voltage generated or induced in the winding during the rotation of the motor (represented by the voltage source 24), as is known to the person skilled in the art.

In the motor-powered drive mode of the motor unit 14 the starter battery 16 powers the motor unit 14. In the motor-powered drive mode of the motor unit 14, current is therefore drawn from the starter battery 16 or the electrical power provided by the starter battery 16 is converted into mechanical power. The motor-powered drive mode is characterized in that the voltage applied across the starter battery 16, or the voltage provided by the starter battery 16 (indicated by the arrow 28), is greater than a voltage induced by the rotation of the motor in the motor unit 14 (indicated by the arrow 30). This is shown schematically by the arrow 28 being longer than the arrow 30.

If in the motor-powered drive mode of the motor unit 14 an electrical connection is now made from the starter battery 16 to the motor unit 14 by closing the switch element 18, a current 32 flows from the starter battery 16 to the motor unit 14. The motor unit 14 is thus powered by the starter battery 16. This is indicated schematically in FIG. 2 by the fact that the arrow 32 points in the direction from the starter battery 16 to the motor unit 14.

Figure 3:
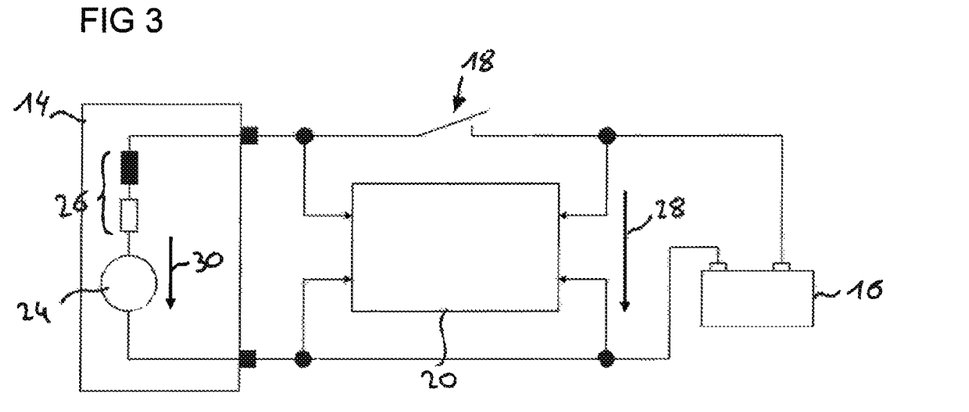

Referring now to FIG. 3, this shows a schematic view of a circuit diagram in which the motor unit 14 is operated in a generator mode.

In the generator mode of the motor unit 14 no current flows from the starter battery 16 to the motor unit 14. However, due to the rotation of the motor, a voltage is induced in the motor unit 14, which is shown schematically in the equivalent circuit diagram by the component 24. The electrical voltage is generated, for example, by the fact that the opening element 12 is moved by manual operation or as a result of gravity, causing a voltage to be induced in the motor unit 14 (schematically indicated by the arrow 30).

If the electrical connection between the motor unit 14 and the starter battery 16 is interrupted or is not made—for example, because the switch element 18 is in an open circuit condition, then although the electrically generated voltage 30 is applied to the motor unit 14, no current flows from the motor unit 14 to the starter battery 16 or from the starter battery 16 to the motor unit 14. This generator mode of the motor unit 14 shown in FIG. 3 is present, for example, when the opening element 12 is moved up or down manually, or if the opening element 12 moves by itself when the vehicle 10 is on a slope (for example, due to the force of gravity). In all these cases, the movement of the opening element 12 induces an electrical voltage in the motor unit 14, which is applied across the motor unit 14 as a generated electrical voltage 30.

Figure 4:
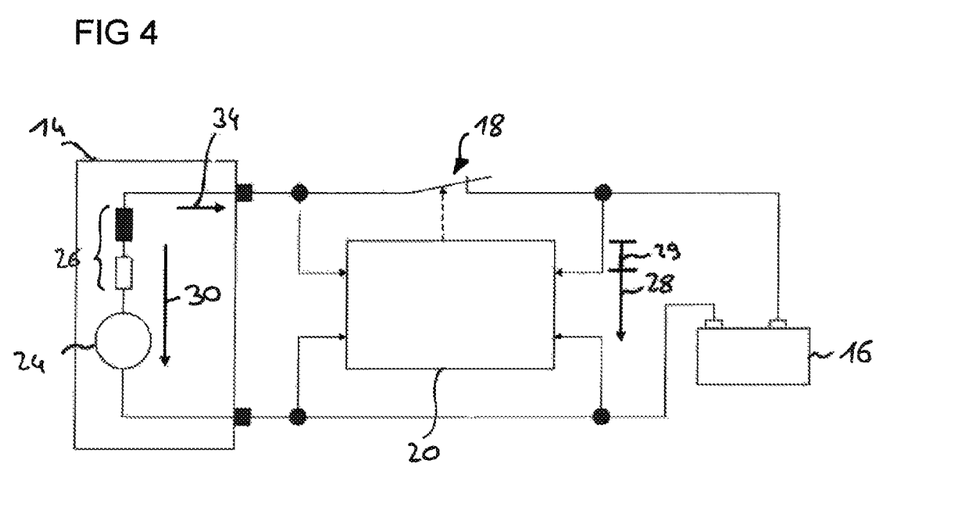

Referring now to FIG. 4, which shows a schematic view of a circuit diagram according to one exemplary embodiment of the method for charging the starter battery 16 using the electrical voltage 30 generated in the generator mode of the motor unit 14.

The circuit diagram according to FIG. 4 differs from the circuit diagram according to FIG. 3 in that the switching element 18 is now shown in the closed switching state. In the closed switching state of the switch element 18 an electrical connection exists from the motor unit 14 to the starter battery 16. Now, if the electrical voltage 30 generated in the generator mode of the motor unit 14 is greater than a predefined voltage value, in particular greater than the voltage 28 that can be supplied by the starter battery 16, then through the electrical connection established from the motor unit 14 to the starter battery 16 a current 34 can flow from the motor unit 14 to the starter battery 16 to charge the starter battery 16. The decisive factor here is that the electrical voltage 30 generated in the generator mode of the motor unit 14 is greater than the voltage 28 that can be supplied by the starter battery 16. Because only in this case can a current or a charging current 34 flow from the motor unit 14 to the starter battery 16 for charging the starter battery 16.

The control unit 20 detects, for example, the generator mode of the motor unit 14 on the basis of the electrical voltage 30 generated by the motor unit 14. The control unit 20 then compares the electrical voltage 30 generated by the motor unit 14 with a specified voltage value, which can be either a fixed value or a voltage that can be supplied by the starter battery 16, in particular an actual voltage or a terminal voltage of the starter battery 16. Now, if the generated electrical voltage 30 is greater than the predetermined voltage value or greater than the voltage 28 that can be supplied by the starter battery 16, then the control unit 20 will control the switch element 18 in such a way that the electrical connection is established from the motor unit 14 to the starter battery 16. In this case, the electrical voltage 30 generated by the motor unit 14 can be used to charge the starter battery 16.

The circuit diagram shown in FIG. 4 thus shows a charging operation of the opening element 12. The charging operation of the opening element 12 differs from the known manual operation of the opening element 12 (see circuit diagram FIG. 3) due to the fact that the voltage 30 generated in the generator mode of the motor unit 14 is greater than the voltage value 28, and in the fact that only in such a case has the switching element 18 established an electrical connection from the motor unit 14 to the starter battery 16. The only way in which the starter battery 16 can thus be charged is by the switch element 18 being put into the closed switching state by the control unit 20 if and only if the generated electrical voltage 30 is greater than the specified voltage value. In addition, if it is ensured that the generated electrical voltage 30 is greater by a threshold 29 than the specified voltage value or than the voltage 28 that can be supplied by the starter battery 16, then a minimum charge current can also be ensured, which enables, for example, sufficiently good charging of the starter battery 16.

Figure 5:
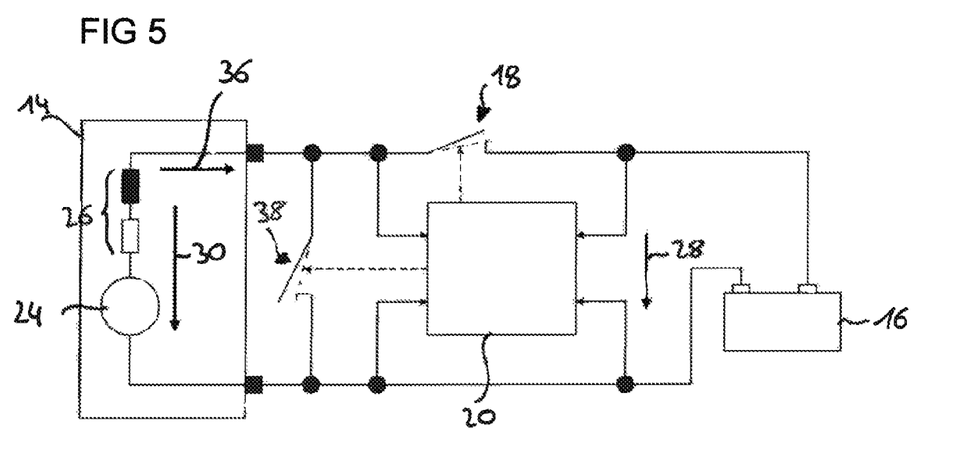

Referring now to FIG. 5, this shows a schematic view of a circuit diagram according to a further exemplary embodiment of the method, which implements an overload protection of the motor unit 14.

In FIG. 5, the motor unit 14 is also operated in the generator mode. The electrical power generated by the motor unit 14 is certainly above a power threshold. The power threshold can be, for example, a power value which must not be exceeded by the motor unit 14, so that the motor unit 14 does not overheat when charging the starter battery 16. The power threshold may have been determined using measurement series, for example, or models. If, for example due to a too rapid up and down movement of the opening element 12 the electrical voltage 30 generated by the motor unit 14 is very much larger than the available voltage 28 from the starter battery 16 and therefore the electrical power generated by the motor unit 14 exceeds a power threshold, then too great a charging current 36 would flow. In this case, the motor unit 14 could overheat and may suffer damage, which must be avoided.

In such an overload operation of the motor unit 14, in accordance with the exemplary embodiment of FIG. 5, however, the current drawn from the motor unit 14 is varied in such a way that when the opening element 12 is moved it responds alternately smoothly or stiffly. In other words, a variation of the current drawn is used to give a feedback message to the operator of the opening element 12 that it is better to refrain from charging the starter battery 16. The variation of the current drawn can be carried out firstly by the fact that after establishing the electrical connection from the motor unit 14 to the starter battery 16 this electrical connection is interrupted for a brief period of time. This is carried out, for example, by the control unit 20 controlling the switch element 18 in such a way that the switching element 18 is placed in its open switching state. The variation of the current drawn can also be carried out, however, by the fact that after establishing the electrical connection from the motor unit 14 to the starter battery 16 the motor unit 14 is short-circuited for a brief period of time. This is carried out, for example by the control unit 20 controlling a further switch element 38 in such a way that this switch element produces a short circuit of the motor unit 14.

By the brief interruption of the electrical connection between the motor unit 14 and the starter battery 16 and/or by briefly short-circuiting the motor unit 14, the current drawn from the motor unit 14 can be varied. This manifests itself as smoothness or stiffness when the opening element 12 is moved. This smoothness and/or stiffness in the movement of the opening element 12 can serve as feedback for the operator, to warn the operator that the motor unit 14 is being operated in overload mode and therefore it is better to refrain from charging the starter battery 16.

Figure 6:
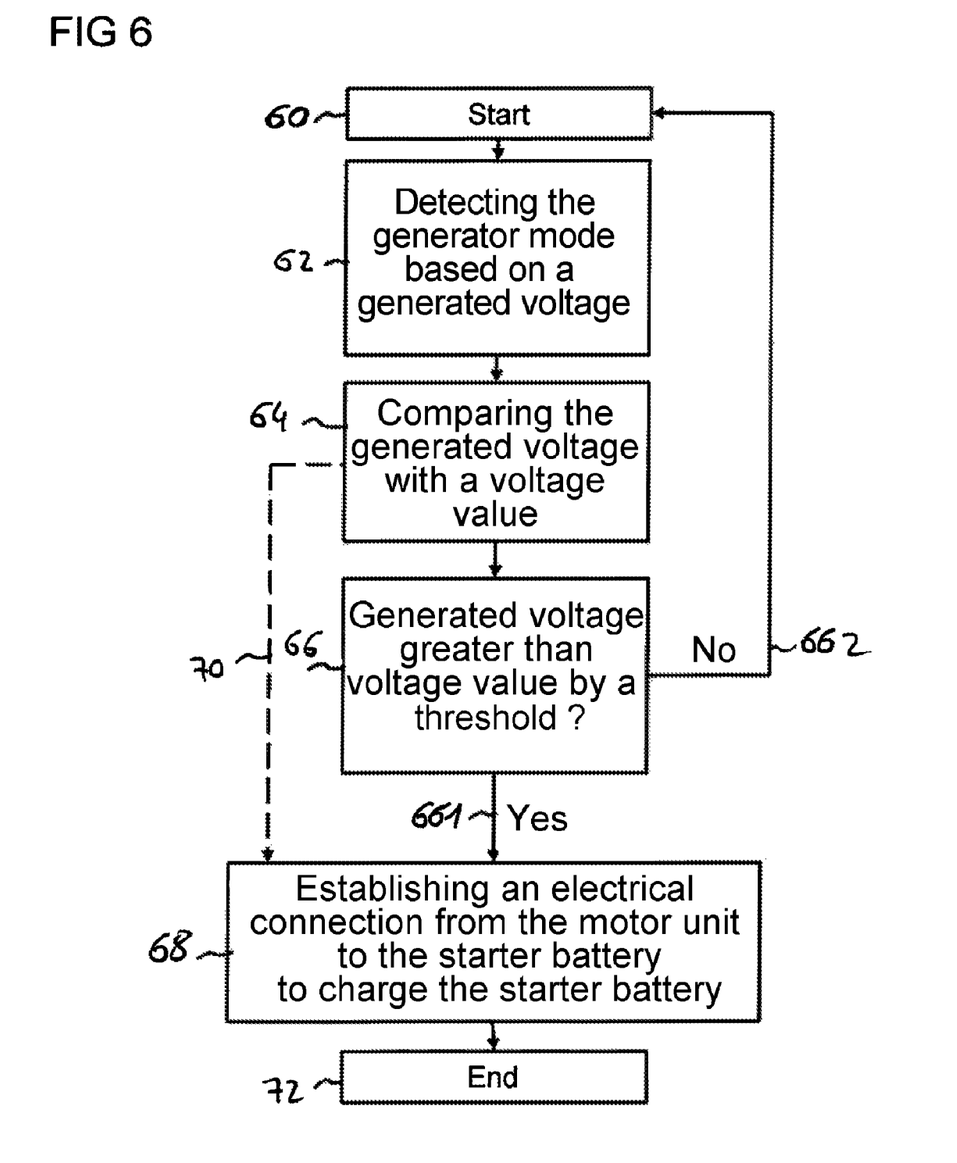

Referring now to FIG. 6, this shows a schematic view of a flow chart according to one exemplary embodiment of the method for charging the starter battery 16.

The method begins with the start at step 60. This is followed by step 62, in which it is detected that the motor unit 14 is operated in the generator mode. This is carried out, for example, by the control unit 20 determining the electrical voltage 30 generated at the motor unit 14. Then, in a step 64 the generated electrical voltage 30 that was determined is compared with a specified voltage value. The specified voltage value can be a fixed voltage value, determined using models or series of measurements, for example. The specified voltage value can also, however, be the voltage 28 instantaneously available from the starter battery 16.

In a further step 66 it is now checked whether the generated voltage is greater than the specified voltage value by a threshold. If in step 661 it was determined that the generated electrical voltage is greater by a threshold than the predetermined voltage value, then in a step 68 the electrical connection from the motor unit 14 to the starter battery 16 is established to charge the starter battery 16. This can be carried out, for example, by the control unit 20 controlling the switching element 18 in such a way that the switching element 18 is placed in a closed switching state. If, however, in a step 662 it was determined that the generated electrical voltage is not greater than the predetermined voltage value by a threshold, the method starts again at step 60.

Of course, it is also possible that the electrical connection from the motor unit 14 to the starter battery 16 is already made when the result of the comparison of the generated voltage with the predetermined voltage value is that the generated voltage is greater than the predetermined voltage value. In other words, it is not necessary for the generated voltage to have to be greater than the voltage value by a threshold. However, this criterion is used to ensure that a minimum charging current for charging the starter battery 16 flows into the starter battery 16. Accordingly, in the flow chart of FIG. 6 a dotted arrow 70 is shown, in which the criterion "generated electrical voltage greater than the predetermined voltage value by a threshold" can be skipped. The method finally ends at step 72.

Figure 7:
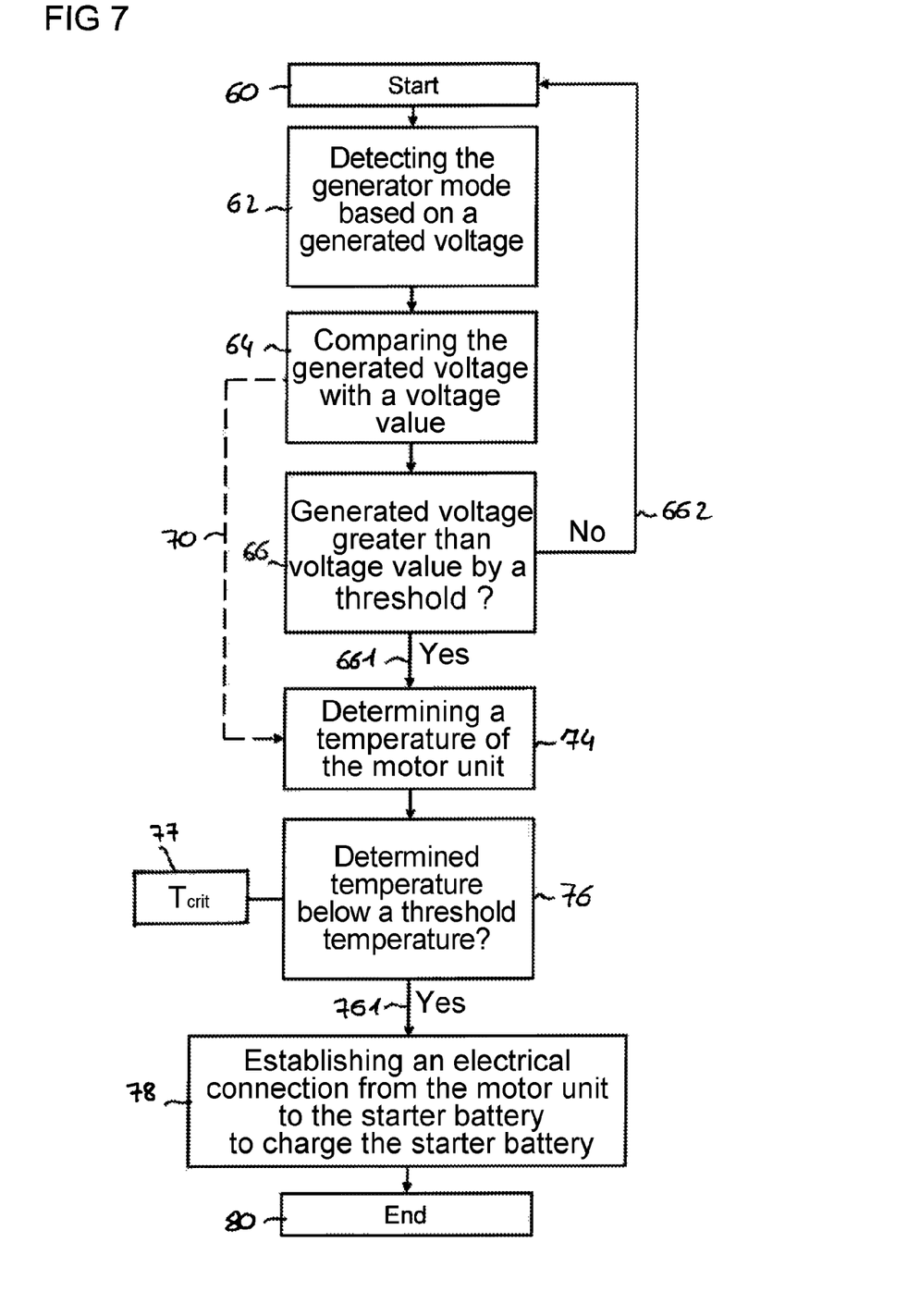

Referring now to FIG. 7, this shows a schematic view of a flow chart according to a further exemplary embodiment of the method according to the invention.

The exemplary embodiment according to FIG. 7 also comprises the steps 60, 62, 64, 66, 661, 662 and 70 of the exemplary embodiment according to FIG. 6. In the exemplary embodiment according to FIG. 7, however, in an additional step 74 a temperature of the motor unit 14 is determined. This can be effected, for example, using a temperature sensor 75 (see FIG. 1). In a step 76, the determined temperature is then compared with a threshold temperature. If the determined temperature is below the threshold temperature (step 761), then in a step 78 the electrical connection from the motor unit 14 to the starter battery 16 is established. In other words, in the exemplary embodiment according to FIG. 7 it is not only checked whether the generated electrical voltage is greater, or greater by a threshold, than the specified voltage value. But it is also checked whether the determined temperature of the motor unit 14 is below a threshold temperature. Only if both criteria are met is an electrical connection established between the motor unit 14 and the starter battery 16. This design ensures that the motor unit 14 does not overheat. For example, if the threshold temperature is a critical temperature $T_{crit}$ for the motor unit, this design ensures that feedback from the motor unit 14 into the starter battery 16 only takes place if the temperature of the motor unit 14 is below the critical temperature. The critical temperature $T_{crit}$ can be input into the method, for example in a step 77. If the motor unit 14 has a temperature that is above the critical temperature, however, then by the design according to FIG. 7 the feedback from the motor unit 14 into the starter battery 16 is interrupted until such time as the temperature of the motor unit 14 has dropped below the critical temperature $T_{crit}$ again. The method finally ends at step 80.

Figure 8:
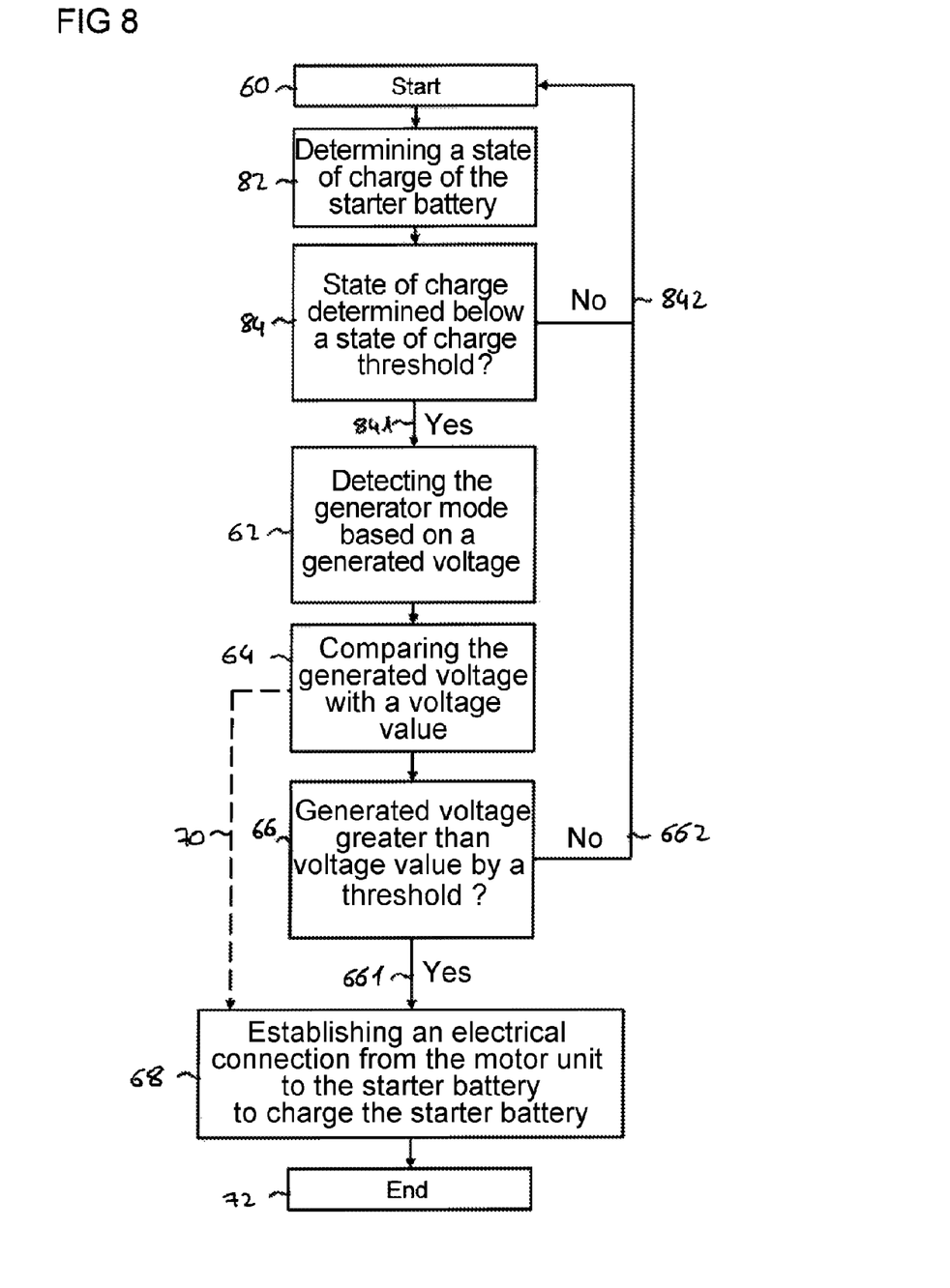

Referring is now to FIG. 8, this shows a schematic view of a flow chart according to a further exemplary embodiment of the method.

The exemplary embodiment according to FIG. 8 also comprises the steps 60, 62, 64, 66, 661, 662, 68, 70 and 72. However, the exemplary embodiment according to FIG. 8 differs from the previously discussed exemplary embodiments in accordance with FIGS. 6 and 7 in the fact that immediately after the start an additional trigger criterion is queried at step 60. Specifically, in the exemplary embodiment of FIG. 8 at step 82 a state of charge of the starter battery 16 is determined. Then, in a step 84 it is checked whether the determined state of charge is below a state of charge threshold. If it is determined in step 84 that the determined state of charge is above the state of charge threshold (step 842), then the method starts again at step 60. However, if in step 84 it is determined that the determined state of charge is below the state of charge threshold (step 841), then the other steps of the method, such as the detection of the generator mode on the basis of a generated voltage (step 62), the comparison of the generated voltage with a predetermined voltage value (step 64) and the establishment of the electrical connection from the motor unit 14 to the starter battery 16, are carried out.

In other words, in the exemplary embodiment of FIG. 8 the rest of the method is only carried out if the state of charge of the starter batteries 16 is below the state of charge threshold. This trigger criterion can be used to ensure that the feedback of the generated electrical voltage into the starter battery 16 only takes place if the starter battery 16 also actually needs to be charged.

Figure 9:
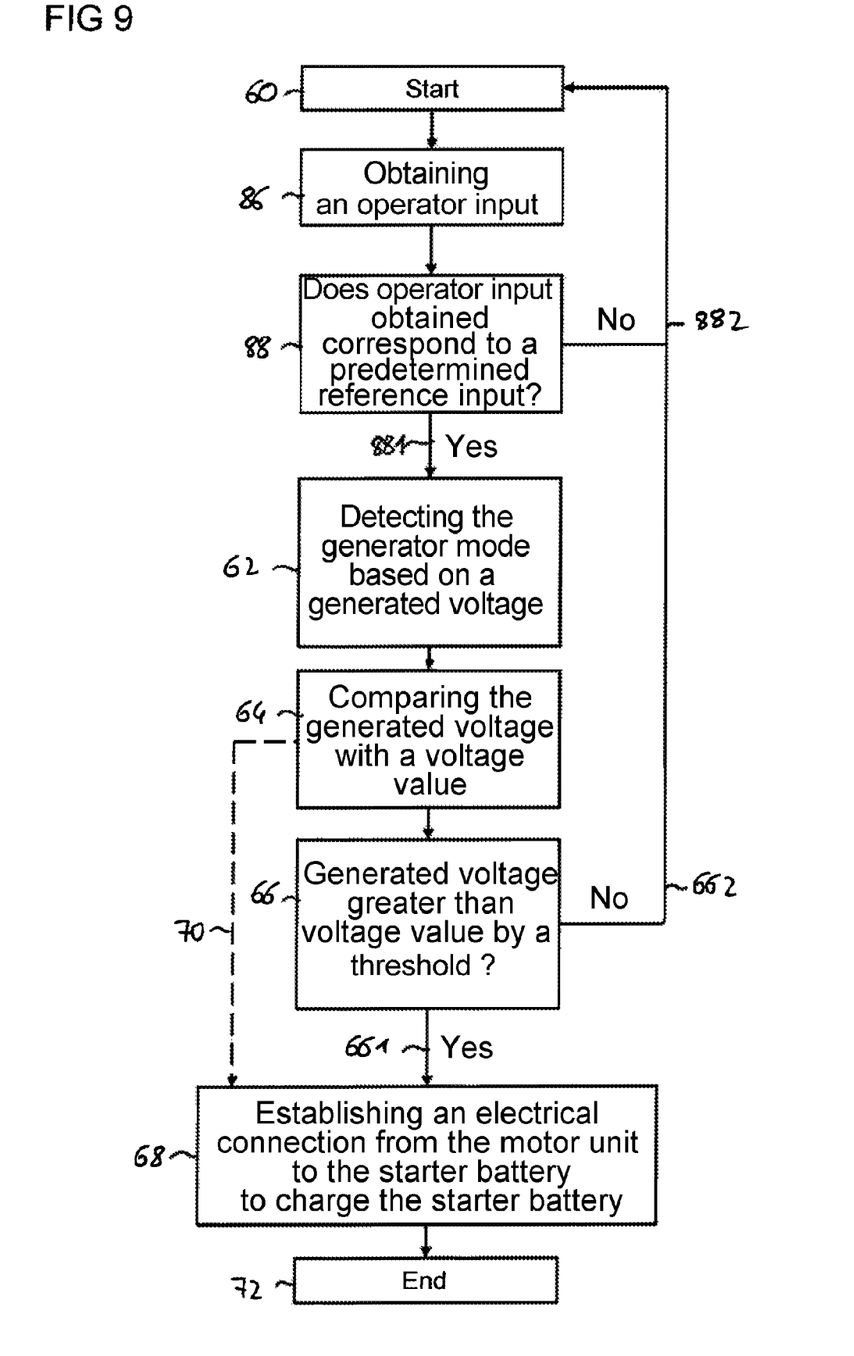

Referring is now to FIG. 9, this shows a schematic view of a flow chart according to a further exemplary embodiment of the method.

The exemplary embodiment according to FIG. 9 also comprises the steps 60, 62, 64, 66, 661, 662, 68, 70 and 72. However, in the exemplary embodiment according to FIG. 9, instead of the trigger criterion "charge status check" a trigger criterion "operator input" is queried. In concrete terms, after the start of the method at step 60 an operator input is determined in step 86. The operator input can be made, for example, by an operator of the opening element 12 and/or of the vehicle 10 and/or by another person. The operator input is used in a similar way to the trigger criterion "charge status check", to check whether the rest of the method should be carried out, i.e. whether, in particular, the electrical connection from the motor unit 14 to the starter battery 16 is to be established to charge the starter battery 16.

For example, the operator input can involve the opening element 12 being moved back and forth several times, without, for example, going into a locked state. Also, it is conceivable for the operator input to take the form of a key combination (for example, pressing the tailgate button three times), the form of a voice command ("charge the starter battery") or a different appropriate HMI input.

In the following step 88 it is then checked whether the operator input obtained matches a predetermined reference input. If the operator input does not match the predetermined reference input (step 882), the method starts again at step 60. This means that the charging of the starter battery 16 by the operator was not indicated, and therefore the charging of the starter battery 16 shall not take place. However, if the operator input obtained matches the predetermined reference input, or the operator input obtained is the same as the predetermined reference input (step 881), it is then determined that the operator intends to charge the starter battery 16 and then the method carries out the steps described so far, such as the detection of the generator mode on the basis of a generated voltage, the comparison of the generated voltage with a voltage value and the establishment of an electrical connection from the motor unit 14 to the starter battery 16. In other words: If the operator input matches the predetermined reference input, then the further method steps are carried out to enable the charging of the starter battery 16.

Of course, the trigger criterion "charge status check" and the trigger criterion "operator input" can be combined with each other in any order. It is also conceivable that a further trigger criterion in the sense of an operator input is taken into account in the method, with which the operator communicates that they would now like to stop the charging operation of the starter battery 16 again. Such operator inputs can in turn be similar or comparable operator inputs to the operator inputs previously described.

Figure 10:
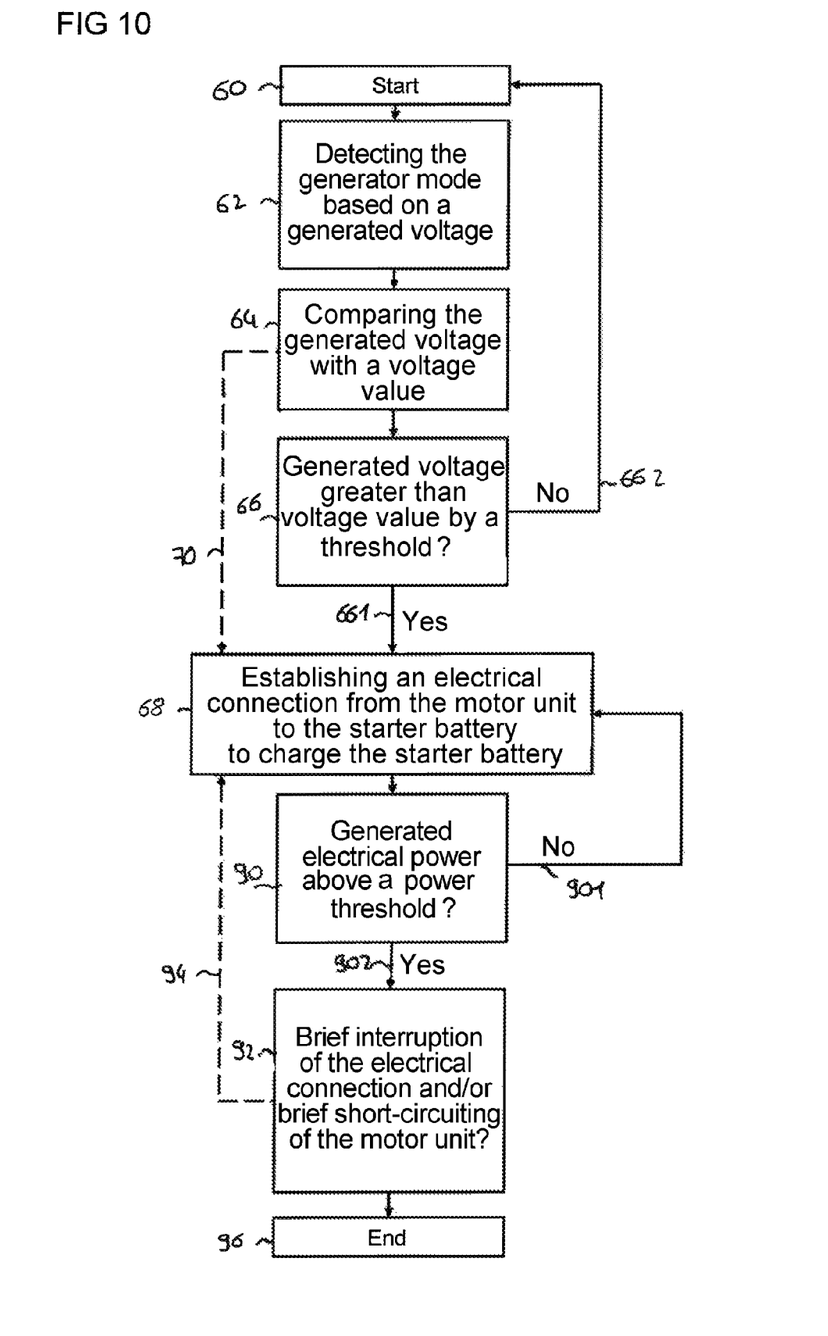

Referring now this to FIG. 10, this shows a schematic view of a flow chart according to a further exemplary embodiment of the method.

The exemplary embodiment according to FIG. 10 again comprises the steps 60, 62, 64, 66, 661, 662, 68 and 70. However, in the exemplary embodiment according to FIG. 10, an overload protection for the motor unit 14 is additionally provided. In concrete terms, after the electrical connection is established from the motor unit 14 to the starter battery 16 (step 68), in a step 90 it is checked whether the electrical power generated in the generator mode of the motor unit 14 is above a power threshold. The power threshold can be, for example, a power value which must not be exceeded by the motor unit 14, so that the motor unit 14 does not overheat when charging the starter battery 16. If the generated electrical power is below the power threshold (step 901), then the method jumps back to step 68, in which the electrical connection from the motor unit 14 to the starter battery 16 is established. In other words, the electrical connection from the motor unit 14 to the starter battery 16 is maintained. This has the consequence that the electrical voltage generated in the generator mode of the motor unit 14 continues to be used to charge the starter battery 16.

However, if the generated electrical power is above the power threshold (step 902), this means that by charging the starter battery 16 the motor unit 14 may overheat and suffer damage. To avoid this, in a step 92 the electrical connection established in step 68 is briefly interrupted. Briefly in this context means that the switch element 18 is placed in an open switching state by the control unit 20 for a period of several milliseconds or seconds, for example. In this case, no current flows from the motor unit 14 to the starter battery 16. At the same time, due to the opening of the switch element 18 the movement of the opening element 12 feels easier in comparison to the movement of the opening element 12 during the charging of the starter battery 16. Alternatively or additionally, in step 92 the motor unit 14 can be briefly short-circuited. This can be carried out, for example, by the control unit 20 placing the further switching element 38 into a closed switching state for a period of several milliseconds or seconds. In this case, the movement of the opening element 12 appears more difficult than the movement of the opening element 12 during the charging of the starter battery 16.

Both the difficult and the easy movement of the opening element 12 can act as feedback for the operator of the opening element 12, to warn the operator that the motor unit 14 is being operated in overload mode and therefore it is better to refrain from charging the starter battery 16. Of course, the brief interruption of the electrical connection and/or the brief short-circuiting of the motor unit 14 can take place alternately with the establishment of the electrical connection from the motor unit 14 to the starter battery 16 (step 68). This is indicated by the dotted case 94. In this case, the movement of the opening element 12 would feel jerky, so that the operator is again warned that it is better to refrain from charging the starter battery 16. The method ends at step 96.

It should be recalled once more that the exemplary embodiments described in connection with FIGS. 1 to 10 can of course be combined with one another in any desired way that is technically feasible.

The invention claimed is:

1. A method for charging a starter battery of a vehicle, wherein the vehicle comprises at least one movable opening element and a motor unit coupled to the opening element and operable in a motor-powered drive mode to drive the opening element and in a generator mode to generate an electrical voltage, said method comprising:
   detecting the generator mode of the motor unit using the electrical voltage generated by the motor unit,
   comparing the generated electrical voltage with a specified voltage value,
   establishing an electrical connection from the motor unit to the starter battery to charge the starter battery if the generated electrical voltage is greater than the voltage value,
   determining a temperature of the motor unit, and
   establishing the electrical connection from the motor unit to the starter battery only if the temperature determined is below a threshold temperature.

2. The method as claimed in claim 1, wherein the voltage value is a voltage that can be supplied by the starter battery.

3. The method as claimed in one of claim 1, wherein the establishment of the electrical connection only takes place if the electrical voltage generated in the generator mode is greater than the voltage value by a threshold.

4. The method as claimed in claim 1, wherein the threshold temperature is a critical temperature of the motor unit.

5. The method as claimed in claim 1, further comprising:
   briefly interrupting the electrical connection after the electrical connection has been established.

6. The method as claimed in claim 5, wherein the brief interruption of the electrical connection is carried out alternately with the establishment of the electrical connection.

7. The method as claimed in claim 5, wherein the brief interruption of the electrical connection only occurs if an electrical power generated by the motor unit in the generator mode exceeds a power threshold.

8. The method as claimed in claim 5, further comprising:
   briefly short-circuiting the motor unit after the electrical connection has been established, wherein at least one of the brief interruption of the electrical connection and the brief short-circuiting of the motor unit only occurs if an electrical power generated by the motor unit in the generator mode exceeds a power threshold.

9. The method as claimed in claim 1, further comprising:
   briefly short-circuiting the motor unit after the electrical connection has been established.

10. The method as claimed in claim 9, wherein the brief short-circuiting of the motor unit is carried out alternately with the establishment of the electrical connection.

11. The method as claimed in claim 9, wherein the brief short-circuiting of the motor unit only occurs if an electrical power generated by the motor unit in the generator mode exceeds a power threshold.

12. The method as claimed in claim 1, further comprising:
   determining a state of charge of the starter battery,
   wherein the step of detecting the generator mode of the motor unit and the step of comparing the generated electrical voltage with a specified voltage value are only performed if the determined state of charge is below a predetermined state of charge threshold.

13. The method as claimed in claim 1, further comprising:
   determining an operator input,
   wherein the step of detecting the generator mode of the motor unit and the step of comparing the generated electrical voltage with a specified voltage value are only performed if the operator input matches a predetermined reference input.

14. A charging device for charging a starter battery of a vehicle, comprising:
   at least one movable opening element and a motor unit, coupled to the opening element and configured to drive the opening element in a motor-powered drive mode and further configured to generate an electrical voltage in a generator mode, wherein said motor unit is electrically connected to the starter battery by an electrical connection and the charging device comprises:
   an electrical switch element, arranged in the electrical connection and having a first switching state configured to establish the electrical connection and a second switching state configured to interrupt the electrical connection, and
   a control unit configured to control the switching states of the switch element, wherein the control unit is further configured to carry out a method as claimed in claim 1.

* * * * *